United States Patent
Zhou et al.

(10) Patent No.: US 10,788,716 B2
(45) Date of Patent: Sep. 29, 2020

(54) LIGHT ALIGNMENT CONTROL METHOD AND LIGHT ALIGNMENT DEVICE

(71) Applicant: SHANGHAI MICRO ELECTRONICS EQUIPMENT (GROUP) CO., LTD., Shanghai (CN)

(72) Inventors: Chang Zhou, Shanghai (CN); Wen Luo, Shanghai (CN); Shucun Zhu, Shanghai (CN)

(73) Assignee: SHANGHAI MICRO ELECTRONICS EQUIPMENT (GROUP) CO., LTD., Shanghai (CN)

( * ) Notice: Subject to any disclaimer, the term of this patent is extended or adjusted under 35 U.S.C. 154(b) by 0 days.

(21) Appl. No.: 16/314,137

(22) PCT Filed: Jun. 29, 2017

(86) PCT No.: PCT/CN2017/090747
§ 371 (c)(1),
(2) Date: Dec. 28, 2018

(87) PCT Pub. No.: WO2018/001298
PCT Pub. Date: Jan. 4, 2018

(65) Prior Publication Data
US 2019/0227388 A1  Jul. 25, 2019

(30) Foreign Application Priority Data

Jun. 30, 2016  (CN) .......................... 2016 1 0510439

(51) Int. Cl.
G02F 1/1337  (2006.01)
G02F 1/13  (2006.01)

(52) U.S. Cl.
CPC ...... *G02F 1/133788* (2013.01); *G02F 1/1303* (2013.01); *G02F 1/1337* (2013.01)

(58) Field of Classification Search
CPC ......... G02F 1/133788; G02F 1/133603; G02F 1/13362; G02F 1/133528;
(Continued)

(56) References Cited

FOREIGN PATENT DOCUMENTS

| CN | 103941413 A | 7/2014 |
|----|-------------|--------|
| CN | 203720500 U | 7/2014 |

(Continued)

OTHER PUBLICATIONS

Machine translation of CN104950521 is attached.*
Machine translation of CN 104950521 with publication date of Feb. 2015 was attached to the Office Action dated Dec. 26, 2019.*

*Primary Examiner* — Mesfin T Asfaw
(74) *Attorney, Agent, or Firm* — Muncy, Geissler, Olds & Lowe, P.C.

(57) ABSTRACT

A photo-alignment control method and a photo-alignment apparatus are disclosed. In the photo-alignment control method, a yaw angle of a motion stage (130) relative to a polarizing illumination device (110) is detected to derive a weighted dynamic polarization angle deviation of a substrate (200), so that a rotational angle of a rotary table (120) for rotating a substrate (200) is controlled, thereby effectively improving a control accuracy of a polarization angle in the photo-alignment process and further to ensure an accuracy of an alignment angle formed in an alignment film.

21 Claims, 4 Drawing Sheets

---

S100: CHOOSE K DISCRETE SAMPLING POINTS IN PHOTO-ALIGNMENT SCANNING DIRECTION AND m DETECTION POINTS IN EXPOSURE FIELD ON SUBSTRATE TO BE PHOTO-ALIGNED, OBTAIN POLARIZATION ANGLE DEVIATIONS AND CORRESPONDING ILLUMINATION INTENSITY LEVELS OF POLARIZED LIGHT AT DETECTION POINTS UPON THEIR INDIVIDUAL SUCCESSIVE COINCIDENCE WITH DISCRETE SAMPLING POINTS DURING PHOTO-ALIGNMENT, AND MEASURE YAW ANGLES OF MOTION STAGE RELATIVE TO POLARIZING ILLUMINATION DEVICE AT DISCRETE SAMPLING POINTS

S200: CALCULATE WEIGHTED DYNAMIC POLARIZATION ANGLE DEVIATIONS FOR DETECTION POINTS EXPERIENCE FORWARD AND REVERSE PHOTO-ALIGNMENT AND OBTAIN WEIGHTED DYNAMIC POLARIZATION ANGLE DEVIATION CONSISTENCY FOR SUBSTRATE

S300: CONTROL ROTATIONS OF ROTARY TABLE FOR ROTATING SUBSTRATE, BASED ON YAW ANGLES OF MOTION STAGE RELATIVE TO THE POLARIZING ILLUMINATION DEVICE AND ON WEIGHTED DYNAMIC POLARIZATION ANGLE DEVIATIONS OF SUBSTRATE

(58) Field of Classification Search
CPC ... G02F 2001/133538; G02F 1/134363; G02F 2001/133757; G02F 1/13363; G02F 1/133753; G02F 1/292; G02F 2001/133531; G02F 2201/30; G02F 2202/022; G02F 2202/023; G02F 2202/32; G02F 2202/40; G02F 1/1333; G02F 1/133504; G02F 2001/133742; G02F 2001/133746; G02F 2001/133749; G02F 2001/133769; H01L 51/5293

See application file for complete search history.

(56) References Cited

FOREIGN PATENT DOCUMENTS

| | | |
|---|---|---|
| CN | 104296874 A | 1/2015 |
| CN | 104390586 A | 3/2015 |
| CN | 104950520 A | 9/2015 |
| JP | 2003141665 A | 5/2003 |
| JP | 2005227019 A | 8/2005 |
| JP | 2013007781 A | 1/2013 |
| JP | 2014174286 A | 9/2014 |
| JP | 2015170409 A | 9/2015 |
| JP | 2015197514 A | 11/2015 |
| KR | 20150009935 A | 1/2015 |
| KR | 20150113816 A | 10/2015 |
| TW | 201539035 A | 10/2015 |
| WO | WO2013/157113 A1 | 10/2013 |

* cited by examiner

PROVIDE TWO GRATING SCALES EXTENDING PARALLEL TO EACH OTHER ALONG PHOTO-ALIGNMENT SCANNING DIRECTION AND MOUNT READING HEADS CORRESPONDING TO RESPECTIVE GRATING SCALES ON SURFACE OF MOTION STAGE TO WHICH PHOTO-ALIGNMENT SCANNING DIRECTION IS PERPENDICULAR ⸺ S121b

OBTAIN READINGS OF GRATING SCALES BY RESPECTIVE READING HEADS AND CALCULATE, BASED ON DIFFERENCES BETWEEN READINGS AND ON DISTANCES BETWEEN CENTERS OF TWO GRATING SCALES, YAW ANGLES OF MOTION STAGE ⸺ S122b

Fig.2b

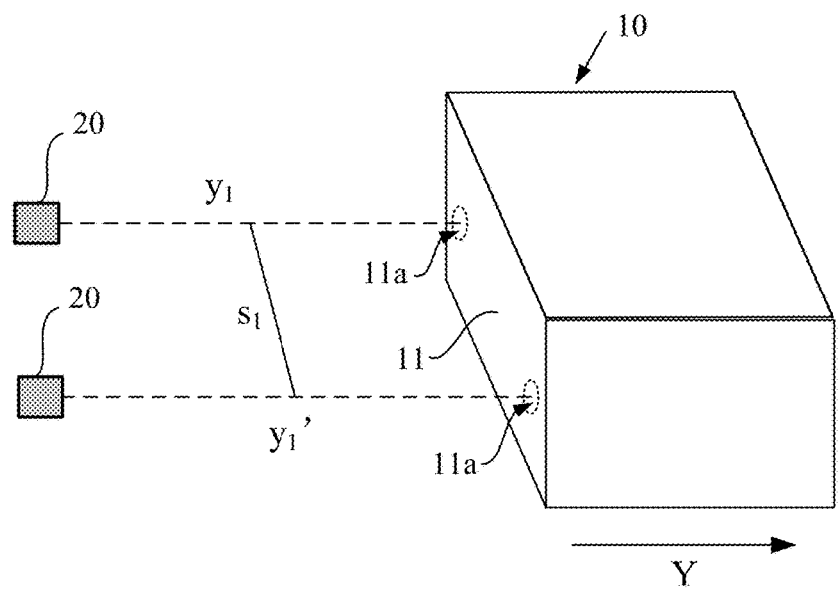

Fig. 3

LIGHT ALIGNMENT CONTROL METHOD AND LIGHT ALIGNMENT DEVICE

TECHNICAL FIELD

The present invention relates to the field of semiconductor manufacturing technology and, in particular, to a photo-alignment control method and a photo-alignment apparatus.

BACKGROUND

A liquid crystal display (LCD) panel typically includes two substrates (a thin film transistor (TFT) array substrate and a color film (CF) substrate), a liquid crystal layer sandwiched between the two substrates and polarizing plates provided on outer sides of the respective substrates. In the liquid crystal display technology, a voltage is applied to create an electric field in the liquid crystal layer to alter a twist angle of the liquid crystal molecules, thus enabling displaying of images with the aid of the two polarizing plates on the outer side of the substrates.

However, in order to ensure desired image display quality, the liquid crystal molecules need to have an initial orientation direction. This is accomplishable by attaching alignment films to the substrates, which allow the liquid crystal molecules to be oriented in a certain direction. In other words, the surfaces of the alignment films may be treated to control and homogenize the orientations of the liquid crystal molecules so that the images are displayed evenly without "mura".

At present, the orienting treatment of an alignment film may utilize a photo-alignment process in which polarized light of a specified wavelength is irradiated onto the alignment film to trigger a photo-reaction, such as photo-cross-linking, photo-decomposition or photo-isomerization in the alignment film in a direction that is the same as or perpendicular to a direction of the polarized axis of the polarized light. As a result, the alignment film will have anisotropic properties and allow directional anchoring which can guide all the liquid crystal molecules to be oriented at a certain angle. However, with the ever-rising demand for a higher display contrast and a higher pixel density, the liquid crystal molecules are being increasingly required to be oriented homogeneously, making it necessary to further ensure the directional consistency of a polarization axis of the photo-alignment apparatus producing the polarized light, i.e., imposing higher requirements on the photo-alignment accuracy of the apparatus, so as to obtain a consistent polarization angle for the photo-alignment process.

During the photo-alignment process, factors affecting the polarization angle mainly include a polarizing illumination device and a motion stage. The polarizing illumination device is configured to provide a polarized light, and any shift in the polarization of the polarized light will lead to an error in the polarization angle. The motion stage is movable on a guide track to allow an exposure scan to proceed, for example, in the Y direction, and is also rotatable perpendicular to the scanning direction (i.e., in the Rz direction). The motion stage functions to transport a substrate carried thereon at a predetermined angle in the Y direction at a certain speed so that the substrate is exposure-scanned and thus photo-aligned. Therefore, in order to obtain an accurate alignment angle by the photo-alignment process and a consistent alignment angle throughout the entire substrate, it is crucial to ensure a good photo-alignment accuracy of the photo-alignment apparatus.

SUMMARY OF THE INVENTION

It is an object of the present invention to provide a photo-alignment control method and a photo-alignment apparatus. The photo-alignment control method is capable of effectively improving a photo-alignment accuracy of the photo-alignment apparatus, guaranteeing a polarization consistency of the polarized light acting on the substrate during the photo-alignment process, and monitoring polarization angle deviation consistency throughout the whole substrate surface.

The present invention provides a photo-alignment control method for controlling a polarization angle deviation consistency of a polarized light during photo-alignment of a substrate by a polarized light emanated from a polarizing illumination device, the photo-alignment control method comprising:

selecting K discrete sampling locations $s \cdot y_k$, $k=1, 2, \ldots, K$ in a photo-alignment scanning direction and selecting M detection points $(X_m, Y_m)$, $m=1, 2, \ldots, M$ within an exposure field on the substrate, obtaining a polarization angle deviation $D(x(X_m, Y_m), y(X_m, Y_m, s \cdot y_k))$ and a corresponding illumination intensity level $I(x(X_m, Y_m), y(X_m, Y_m, s \cdot y_k))$ for each of the detection points at each of the discrete sampling locations during photo-alignment, and measuring a yaw angle $Yaw(s \cdot y_k)$ of the motion stage, on which the substrate is carried, relative to the polarizing illumination device at each of the discrete sampling locations;

calculating a weighted dynamic polarization angle deviation $WD_{dyn}(X_m, Y_m)$ for each detection points $(X_m, Y_m)$ after forward and reverse photo-alignment scans have been carried out according to:

$$WD_{dyn}(X_m, Y_m) = \frac{\sum_{k=1}^{K}(I(x(X_m, Y_m), y(X_m, Y_m, s \cdot y_k)) \times (D(x(X_m, Y_m), y(X_m, Y_m, s \cdot y_k)) + Yaw(s \cdot y_k))) + \sum_{k=K}^{1}(I(x(X_m, Y_m), y(X_m, Y_m, s \cdot y_k)) \times (D(x(X_m, Y_m), y(X_m, Y_m, s \cdot y_k)) + Yaw(s \cdot y_k)))}{\sum_{k=1}^{K} I(x(X_m, Y_m), y(X_m, Y_m, s \cdot y_k)) + \sum_{k=K}^{1} I(x(X_m, Y_m), y(X_m, Y_m, s \cdot y_k))}$$

where $(x(X_m, Y_m), y(X_m, Y_m, s \cdot y_k))$ represents a coordinate of the detection points in a coordinate system of the motion stage, the detection point having a coordinate of $(X_m, Y_m)$ in a coordinate system of the substrate;

obtaining weighted dynamic polarization angle deviation consistency $Mura_{dyn}$ for the substrate according to:

$$Mura_{dyn} = \left| \frac{\max(WD_{dyn}(X_m, Y_m)) - \min(WD_{dyn}(X_m, Y_m))}{2} \right|;$$

and controlling s rotation angle of a rotary table disposed between the substrate and the motion stage and configured to rotate the substrate, based on the yaw angles of the motion stage relative to the polarizing illumination device and on the weighted dynamic polarization angle deviation consistency $Mura_{dyn}$ of the substrate.

Optionally, the polarization angle deviations may be a difference between an actual polarization angle of the polarized light received at the detection points during the photo-alignment process and a nominal polarization angle of the polarized light.

Optionally, $(x(X_m, Y_m), y(X_m, Y_m, s \cdot y_k))$ may be given by:

$$\begin{pmatrix} x(X_m, Y_m) \\ y(X_m, Y_m, s \cdot y_k) \end{pmatrix} = \begin{pmatrix} \cos(Rt) & -\sin(Rt) \\ \sin(Rt) & \cos(Rt) \end{pmatrix}$$
$$\left( \begin{pmatrix} Mp & 0 \\ 0 & Mp \end{pmatrix} \begin{pmatrix} \cos(Rp) & -\sin(Rp) \\ \sin(Rp) & \cos(Rp) \end{pmatrix} \begin{pmatrix} X_m \\ Y_m \end{pmatrix} + \begin{pmatrix} Cpx \\ Cpy \end{pmatrix} \right) + \begin{pmatrix} 0 \\ s \cdot y_k \end{pmatrix};$$

where Rt represents a rotation of the rotary table for rotating the substrate,

Mp represents an expansion ratio of the substrate to the motion stage located under the rotary table, Rp represents a rotation of the substrate relative to the motion stage, and $$\begin{pmatrix} Cpx \\ Cpy \end{pmatrix}$$

represents a translation of the substrate relative to the motion stage.

Optionally, the rotation Rt of the rotary table, the expansion ratio Mp of the substrate to the motion stage located under the rotary table, and the rotation Rp of the substrate relative to the motion stage may be obtained by:

providing, on the substrate, I alignment marks with nominal positions of the I alignment marks in the coordinate system of the substrate being denoted as $(X_i, Y_i)$, i=1, 2, ..., I;

individually aligning the I alignment marks using an alignment system to obtain test positions $(Cas_i, Cay_i)$, i=1, 2, ..., I of the I alignment marks; and based on the nominal positions $(X_i, Y_i)$, i=1, 2, ..., I and the test positions $(Cax_i, Cay_i)$, i=1, 2, ..., I of the alignment marks, as well as a corresponding position $(s \cdot y_i)$, i=1, 2, ..., I of the motion stages during the alignment, obtaining Rt, Mp and Rp according to a substrate alignment model defined by:

$$\begin{pmatrix} Cax_i \\ Cay_i \end{pmatrix} = \begin{pmatrix} \cos(Rt) & -\sin(Rt) \\ \sin(Rt) & \cos(Rt) \end{pmatrix}$$
$$\left( \begin{pmatrix} Mp & 0 \\ 0 & Mp \end{pmatrix} \begin{pmatrix} \cos(Rp) & -\sin(Rp) \\ \sin(Rp) & \cos(Rp) \end{pmatrix} \begin{pmatrix} X_i \\ Y_i \end{pmatrix} + \begin{pmatrix} Cpx \\ Cpy \end{pmatrix} \right) + \begin{pmatrix} 0 \\ s \cdot y_i \end{pmatrix}.$$

Optionally, measuring the yaw angle $\text{Yaw}(s \cdot y_k)$ of the motion stage relative to the polarizing illumination device at each of the discrete sampling locations may comprise:

Measuring a yaw angle $\text{Yaw}_1(s \cdot y_k)$ of the motion stage at each of the discrete sampling locations and a yaw angle $\text{Yaw}_2(s \cdot y_k)$ of the polarizing illumination device at each of the discrete sampling locations, obtaining $\text{Yaw}(s \cdot y_k)$ as $\text{Yaw}(s \cdot y_k) = \text{Yaw}_1(s \cdot y_k)/\text{Yaw}_2(s \cdot y_k)$.

Optionally, measuring the yaw angle $\text{Yaw}_1(s \cdot y_k)$ of the motion stage at each of the discrete sampling locations may comprises:

selecting a side face of the motion stage as a measurement surface and directing two measuring light beams of a first interferometers onto the measurement surface; and obtaining a length difference $\Delta y_1$ between optical paths of the two measuring light beams of the first interferometer to the measurement surface of the motion stage and a distance $s_1$ between centers of the optical paths of the measuring light beams and calculating the yaw angle $\text{Yaw}_1(s \cdot y_k)$ of the motion stage according to $\text{Yaw}_1(s \cdot y_k) = \Delta y_1/s_1$.

Optionally, the measurement surface may be a side face of the motion stage to which the photo-alignment scanning direction is perpendicular to.

Optionally, measuring the yaw angle $\text{Yaw}_1(s \cdot y_k)$ of the motion stage at each of the discrete sampling locations may comprise:

providing two grating scales arranged parallel to each other along the photo-alignment scanning direction and mounting reading heads corresponding to the respective grating scales on a side face of the motion stage to which the photo-alignment scanning direction is perpendicular; and obtaining readings of the grating scales by the respective reading heads based on a difference between the readings of the two grating scales and on a distance $s_1$ between centers of the two grating scales, calculating the yaw angle $\text{Yaw}_1(s \cdot y_k)$ of the motion stage, according to $\text{Yaw}_1(s \cdot y_k) = \Delta y_1/s_1$.

Optionally, measuring the yaw angle $\text{Yaw}_2(s \cdot y_k)$ of the polarizing illumination device at each of the discrete sampling locations comprises:

selecting a side face of a linear grating frame in the polarizing illumination device as a measurement surface and directing two measuring light beams of a second interferometer onto the measurement surface; and obtaining a length difference $\Delta y_2$ between optical paths of the two measuring light beams of the second interferometers to the measurement surface of the polarizing illumination device and a distance $s_2$ between centers of the optical paths of the measuring light beams, calculating the yaw angle $\text{Yaw}_1(s \cdot y_k)$ of the polarizing illumination device according to $\text{Yaw}_2(s \cdot y_k) = \Delta y_2/s_2$.

Optionally, the measurement surface of the polarizing illumination device may be a side face of the linear grating frame to which the photo-alignment scanning direction is perpendicular.

Optionally, the $\text{Yaw}(s \cdot y_k)$ may be calculated according to:

$$\begin{cases} \text{Yaw}_2(s.y_k) \geq \text{Yaw}_1(s \cdot y_k)/10, & \text{Yaw}(s \cdot y_k) = \text{Yaw}_1(s \cdot y_k)/\text{Yaw}_2(s \cdot y_k) \\ \text{Yaw}_2(s.y_k) < \text{Yaw}_1(s \cdot y_k)/10, & \text{Yaw}(s \cdot y_k) = \text{Yaw}_1(s \cdot y_k) \end{cases}.$$

Based on the photo-alignment control method as defined above, the present invention also provides a photo-alignment apparatus comprising a polarizing illumination device, a rotary table configured to carry and rotate a substrate, and a motion stage located under the rotary table and configured to move the substrate so that the substrate experiences a photo-alignment scan, the photo-alignment apparatus further comprising:

a motion stage yaw measurement device for measuring a yaw angle of the motion stage during the photo-alignment process;

a polarizing illumination device yaw measurement device for measuring s yaw angle of the polarizing illumination device during the photo-alignment process; and a polarization angle deviation control unit configured to calculate a weighted dynamic polarization angle deviation of the substrate based on the yaw angle of the motion stage and the yaw angles of the polarizing illumination device and to control a rotation of the rotary table based on yaw angle of the motion stage relative to the polarizing illumination device and the weighted dynamic polarization angle deviation of the substrate.

Optionally, the motion stage yaw measurement device may comprise a first interferometric measuring device and a first reflector, the first reflector mounted on a side face of the motion stage, the first interferometric measuring device configured to direct two first measuring light beams onto the first reflector and to collect light beams reflected from the first reflector so as to obtain a length difference $\Delta y_1$ between optical paths of the two first measuring light beams from the first interferometric measuring device to the side face of the motion stage, and to calculate, based on the length difference $\Delta y_1$ and a distance $s_1$ between centers of the two first measuring light beams of the first interferometric measuring device, the yaw angles $Yaw_1(s \cdot y_k)$ of the motion stage according to $Yaw_1(s \cdot y_k) = \Delta y_1/s_1$.

Optionally, the first reflector may be mounted on a side face of the motion stage to which the photo-alignment scanning direction is perpendicular.

Optionally, the first interferometric measuring device may comprise two single-axis interferometers.

Optionally, the first interferometric measuring device may comprise one two-axis interferometer.

Optionally, the motion stage yaw measurement device may comprise two grating scales arranged parallel to each other along the photo-alignment scanning direction and reading heads corresponding to the respective grating scales, the reading heads mounted on a side face of the motion stage to which the photo-alignment scanning direction is perpendicular, the reading heads configured to acquire readings of the respective grating scales and to calculate, based on a difference $\Delta y_1$ between the readings of the two grating scales and on a distance $s_1$ between centers of the two grating scales, the yaw angle $Yaw_1(s \cdot y_k)$ of the motion stage, according to $Yaw_1(s \cdot y_k) = \Delta y_1/s_1$.

Optionally, the polarizing illumination device measurement device may comprise a second interferometric measuring device and a second reflector, the second reflector mounted on a side face of a linear grating frame in the polarizing illumination device, the second interferometric measuring device configured to direct two second measuring light beams onto the second reflector and to collect light beams reflected from the second reflector so that a difference $\Delta y_2$ between optical paths of the two second measuring light beams from the second interferometric measuring device to the side face of the linear grating frame, and to calculate, based on the length difference $\Delta y_2$ and a distance $s_2$ between centers of the two second measuring light beams, the yaw angle $Yaw_2(s \cdot y_k)$ of the motion stage, according to $Yaw_2(s \cdot y_k) = \Delta y_2/s_2$.

Optionally, the photo-alignment scanning direction may be perpendicular to the side face of the linear grating frame, on which the second reflector is mounted.

Optionally, the second interferometric measuring device may comprise two single-axis interferometers.

Optionally, the second interferometric measuring device may comprise one two-axis interferometer.

Optionally, the polarizing illumination device may comprise a lighting frame, the lighting frame comprising a trough-shaped reflector and a lamp, the lamp configured to emit light which is reflected by the trough-shaped reflector to form a light beam propagating at a predetermined angle.

Optionally, the trough-shaped reflector may be a parabolic reflector.

Optionally, the lamp may have a length greater than a length of the substrate in a direction perpendicular to the photo-alignment scanning direction.

Optionally, the polarizing illumination device may comprise a linear grating frame, the linear grating frame comprising a stack of a filter, a polarizing linear grating and a linear grating protection glass, compressed air introduced between the filter, the polarizing linear grating and an inert gas introduced between the polarizing linear grating and the linear grating protection glass.

Optionally, the inert gas may be nitrogen.

Optionally, the polarizing linear grating may comprise a transparent substrate and a grating consisting of a number of strips and formed on the transparent substrate.

Optionally, the grating may be fabricated from a metal or a metal compound.

Optionally, the metal may be aluminum.

Optionally, the metal compound may be titanium oxide.

In the photo-alignment control method of the present invention, the detection and monitoring of the yaw angle of the motion stage relative to the polarizing illumination device takes into account both the influence of the polarizing illumination device on the polarization angle and the yaw angle of the motion stage, thereby more comprehensively reflecting the conditions of the polarization angle acting on the substrate during the photo-alignment process and better revealing real errors in the alignment angle of the alignment film. Moreover, weighted dynamic polarization angle deviations of the substrate can be derived from the yaw angle detection results and serve as a basis for rotation adjustments of the rotary table. This can effectively improve polarization angle control accuracy of the photo-alignment process and enhance accuracy of the alignment angle formed in the alignment film. Further, with the photo-alignment control method of the present invention, it is further possible to confirm weighted dynamic polarization angle deviation consistency of the substrate, which is a direct reflection of the alignment angle consistency throughout the entire substrate surface during the photo-alignment process.

In the photo-alignment apparatus of the present invention, the polarization angle deviation control unit monitors and adjusts yaw angles of the motion stage and the polarizing illumination device in real time. This, on the one hand, increases a positioning accuracy of the motion stage and, on the other hand, enhances a photo-alignment control accuracy of the photo-alignment apparatus, thus ensuring the polarization axis acting on the substrate to remain within the predetermined range.

BRIEF DESCRIPTION OF THE DRAWINGS

FIG. 2b is a flowchart schematically showing another process for measuring yaw angles of the motion stage in the photo-alignment control method according to Example 1 of the present invention.

FIG. 3 shows principles for measuring yaw angles in the photo-alignment control method according to Example 1 of the present invention.

DETAILED DESCRIPTION

Figure 1:
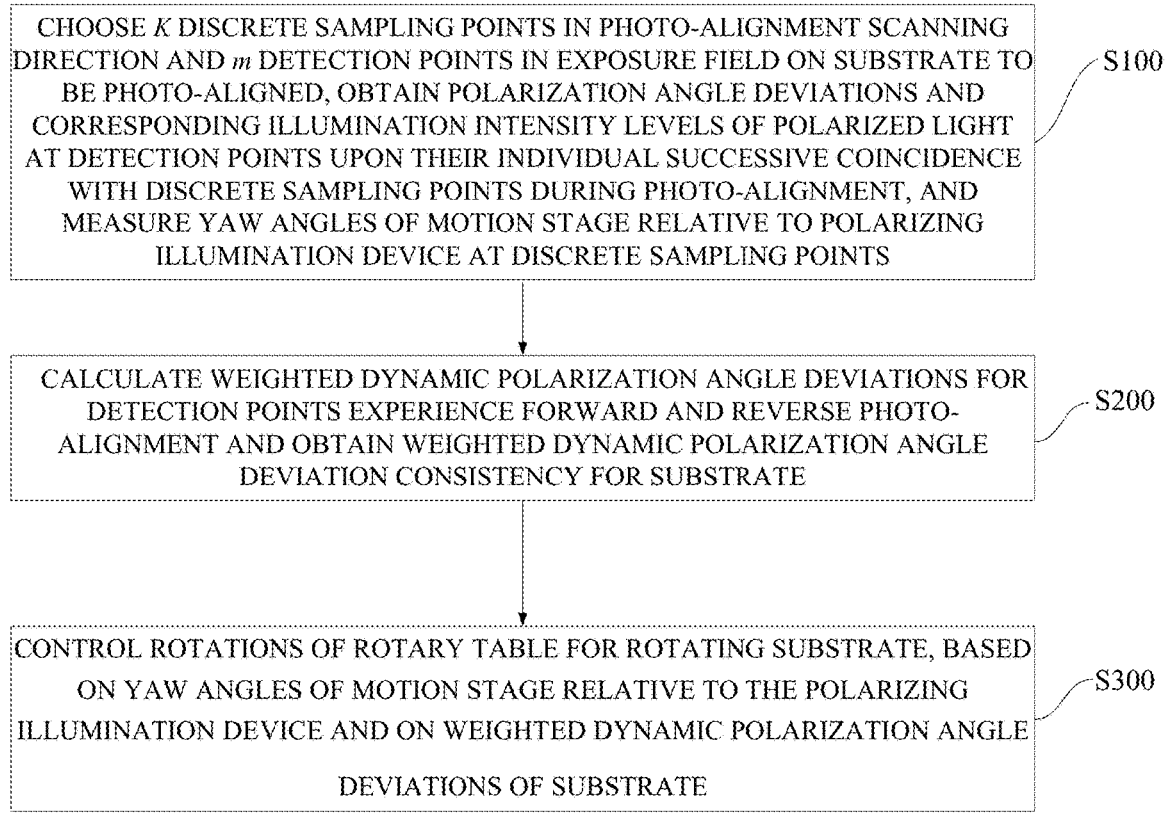
FIG. 1 is a flowchart schematically showing a photo-alignment control method according to Example 1 of the present invention.

As mentioned in the Background, a photo-alignment process performed on an alignment film may be subject to limitations in positioning accuracy of the polarizing illumination device and the motion stage, which may lead to variations in the polarization angle and hence adversely affect alignment angle consistency of the alignment film.

In order to ensure the performance of the polarizing illumination device, the inventors hereof propose a model for calculating "weighted static polarization angle deviation consistency", $Mura_{sta}$. During the photo-alignment process, the polarizing illumination device provides a polarized light for irradiating the alignment film located on a substrate, triggering the occurrence of photo-reaction in the alignment film that is in a direction parallel or perpendicular to the polarization direction of the polarized light. Such a photo-alignment exposure process is associated with a deviation accumulating from scanning and depending on both the illuminance and direction of the polarization axis of the of the polarized light acting on the alignment film. The "weighted static polarization angle deviation consistency", $mura_{sta}$, can provide for overall characterization of the polarized light's illuminance and polarization axis direction.

In particular, a method involving $mura_{sta}$ calculation for the polarizing illumination device includes:

choosing K discrete sampling locations in a static exposure field for photo-alignment, wherein K is a positive integer; and determining illuminance levels $I(x_i, y_j)$ and polarization angles $P_A(x_i, y_j)$ at the respective sampling locations, wherein $(x_i, y_j)$ represents the positions of the sampling locations in a coordinate system of the substrate, and $1 \leq i \leq M$, $1 \leq j \leq N$, where i, j, M and N are all natural numbers. According to a preferred embodiment, M*N=K may be satisfied. The illuminance levels $I(x_i, y_j)$ and polarization angles $P_A(x_i, y_j)$ may be measured using a conventional method which will not be described in further detail herein for the sake of simplicity. Next, based on the positions of the sampling locations, the illuminance levels and deviations $D(x_i, y_j)$ in the polarization angles are recorded.

The deviations $D(x_i, y_j)$ in the polarization angles satisfy $D(x_i, y_j)=P_A(x_i, y_j)-P_T(x_i, y_j)$, where, $P_A(x_i, y_j)$—actual polarization angles;

$P_T(x_i, y_j)$—nominal polarization angles.

Table 1 lists the illuminance levels $I(x_i, y_j)$ at the points in the static exposure field, and Table 2 shows the polarization angle deviations $D(x_i, y_j)$ at the points in the static exposure field. Wherein, a longitudinal direction of a high-pressure UV lamp that produces the polarized light may be defined as the X direction, and a scanning direction in the photo-alignment process may be defined as the Y direction. As such, in the embodiment of Tables 1 and 2, the chosen discrete points forms 7 sets in the X-direction (i.e., M=7) and 5 sets in the Y direction (i.e., N=5). However, the present invention is not so limited, because M and N may be different values in other embodiments.

TABLE 1

| $I(x_1, y_1)$ | $I(x_2, y_1)$ | $I(x_3, y_1)$ | $I(x_4, y_1)$ | $I(x_5, y_1)$ | $I(x_6, y_1)$ | $I(x_7, y_1)$ |
| $I(x_1, y_2)$ | $I(x_2, y_2)$ | $I(x_3, y_2)$ | $I(x_4, y_2)$ | $I(x_5, y_2)$ | $I(x_6, y_2)$ | $I(x_7, y_2)$ |
| $I(x_1, y_3)$ | $I(x_2, y_3)$ | $I(x_3, y_3)$ | $I(x_4, y_3)$ | $I(x_5, y_3)$ | $I(x_6, y_3)$ | $I(x_7, y_3)$ |
| $I(x_1, y_4)$ | $I(x_2, y_4)$ | $I(x_3, y_4)$ | $I(x_4, y_4)$ | $I(x_5, y_4)$ | $I(x_6, y_4)$ | $I(x_7, y_4)$ |
| $I(x_1, y_5)$ | $I(x_2, y_5)$ | $I(x_3, y_5)$ | $I(x_4, y_5)$ | $I(x_5, y_5)$ | $I(x_6, y_5)$ | $I(x_7, y_5)$ |

TABLE 2

| $I(x_1, y_1)$ | $I(x_2, y_1)$ | $I(x_3, y_1)$ | $I(x_4, y_1)$ | $I(x_5, y_1)$ | $I(x_6, y_1)$ | $I(x_7, y_1)$ |
| $I(x_1, y_2)$ | $I(x_2, y_2)$ | $I(x_3, y_2)$ | $I(x_4, y_2)$ | $I(x_5, y_2)$ | $I(x_6, y_2)$ | $I(x_7, y_2)$ |
| $I(x_1, y_3)$ | $I(x_2, y_3)$ | $I(x_3, y_3)$ | $I(x_4, y_3)$ | $I(x_5, y_3)$ | $I(x_6, y_3)$ | $I(x_7, y_3)$ |
| $I(x_1, y_4)$ | $I(x_2, y_4)$ | $I(x_3, y_4)$ | $I(x_4, y_4)$ | $I(x_5, y_4)$ | $I(x_6, y_4)$ | $I(x_7, y_4)$ |
| $I(x_1, y_5)$ | $I(x_2, y_5)$ | $I(x_3, y_5)$ | $I(x_4, y_5)$ | $I(x_5, y_5)$ | $I(x_6, y_5)$ | $I(x_7, y_5)$ |

From the illuminance levels and polarization angle deviations distributed in the static exposure field, as presented in Tables 1 and 2, weighted static polarization angle deviations $WD_{sta}$ accumulated from the X-directional scan performed in the static exposure field can be given as:

$$WD_{sta}(x_i) = \frac{\sum_{j=1}^{N} I(x_i, y_i) \times D(x_i, y_i)}{\sum_{j=1}^{N} I(x_i, y_i)}$$

where, N represents the number of discrete points in the scanning direction (Y direction), and N=5 in this embodiment.

On this basis, the weighted static polarization angle deviation consistency $Mura_{sta}$ for the whole static exposure field is defined as:

$$Mura_{sta} = \pm \frac{\max(WD_{sta}(x_i)) - \min(WD_{sta}(x_i))}{2}$$

where, $\max(WD_{sta}(x_i))$ is the maximum value of the weighted static polarization angle deviations $WD_{sta}(x_i, y_j)$ of the X-directional sets, and $\min(WD_{sta}(x_i))$ is the minimum value of the weighted static polarization angle deviations $WD_{sta}(x_j, y_j)$ of the X-directional sets.

The weighted static polarization angle deviation consistency $Mura_{sta}$ can be used to verify whether the polarized light provided by the polarizing illumination system of the photo-alignment apparatus is satisfactory, thereby enhancing the resulting alignment angle accuracy of the alignment film.

However, the weighted static polarization angle deviation consistency $Mura_{sta}$ can only be used in static applications of the polarizing illumination system. In practice, the photo-alignment exposure process is carried out with the substrate carried on a motion stage of the photo-alignment apparatus and transported by the motion stage in the scanning direction, thus to complete the photo-alignment process of the exposure. That is, an unignorable deviation affecting the photo-alignment process may arise from the mechanical movement of the motion stage during the photo-alignment process. Positioning errors of the motion stage, reflected by excesses in a yaw angle of the motion stage, may lead to a shift in the direction of the polarization axis.

In view of this, the inventors hereof propose a model for calculating a "weighted dynamic polarization angle deviation consistency", $Mura_{dyn}$, which reflects the overall influence of the polarizing illumination device and the motion stage on the result of the photo-alignment process. Specifically, a corresponding photo-alignment control method includes:

choosing K discrete sampling locations $s \cdot y_k$, k=1, 2, ..., K photo-alignment scanning direction and M detection points $(X_m, Y_m)$, m=1, 2, ..., M in an exposure field on the substrate to be photo-aligned, obtaining polarization angle deviations $D(x(X_m, Y_m), y(X_m, Y_m, s \cdot y_k)$ and corresponding illumination intensity levels $I(x(X_m, Y_m), y(X_m, Y_m, s \cdot y_k)$ of the polarized light for each of the detection points at each of the discrete sampling locations during the photo-alignment process, and measuring yaw angles $Yaw(s \cdot y_k)$ of the motion stage relative to the polarizing illumination device at the discrete sampling locations;

calculating weighted dynamic polarization angle deviations $WD_{dyn}(X_m, Y_m)$ for each of the detection points $(X_m, Y_m)$ after forward and reverse photo-alignment scans have been carried out according to:

$$WD_{dyn}(X_m, Y_m) = \frac{\sum_{k=1}^{K}(I(x(X_m, Y_m), y(X_m, Y_m, s \cdot y_k)) \times (D(x(X_m, Y_m), y(X_m, Y_m, s \cdot y_k)) + Yaw(s \cdot y_k))) + \sum_{k=K}^{1}(I(x(X_m Y_m), y(X_m, Y_m, s \cdot y_k)) \times (D(x(X_m Y_m), y(X_m, Y_m, s \cdot y_k)) + Yaw(s \cdot y_k)))}{\sum_{k=1}^{K} I(x(X_m Y_m), y(X_m, Y_m, s \cdot y_k)) + \sum_{k=K}^{1} I(x(X_m Y_m), y(X_m, Y_m, s \cdot y_k))},$$

where, $(x(X_m, Y_m), y(X_m, Y_m, s \cdot y_k))$ represents coordinates of the detection points in a coordinate system of the motion stage, the detection point having a coordinate $(X_m, Y_m)$ in a coordinate system of the substrate;

obtaining the weighted dynamic polarization angle deviation consistency $Mura_{dyn}$ for the substrate from:

$$Mura_{dyn} = \left| \frac{\max(WD_{dyn}(X_m, Y_m)) - \min(WD_{dyn}(X_m, Y_m))}{2} \right|;$$

and controlling a rotation of a rotary table for rotating the substrate based on the yaw angle of the motion stage relative to the polarizing illumination device and on the weighted dynamic polarization angle deviation consistency $Mura_{dyn}$ of the substrate.

With this photo-alignment control method, on the one hand, it is possible to detect and monitor the overall performance of the photo-alignment apparatus and thus better know its stability conditions, with data from online monitoring directly reflecting alignment angle conditions in the alignment film. On the other hand, it is possible to adjust the photo-alignment apparatus based on the detected results and hence ensure a satisfactory photo-alignment control accuracy.

The photo-alignment control method and the photo-alignment apparatus proposed herein will be described in greater detail below with reference to the accompanying drawings which illustrate several particular examples. Features and advantages of the invention will be more apparent from the following detailed description, and from the appended claims. Note that the accompanying drawings are provided in a very simplified form not necessarily presented to scale, with the only intention of facilitating convenience and clarity in explaining the examples.

Embodiment 1

FIG. 1 shows a schematic flowchart of a photo-alignment control method according to Embodiment 1 of the present invention. As shown, the photo-alignment control method includes:

S100: choosing K discrete sampling locations $s \cdot y_k$, k=1, 2, ..., K in a photo-alignment scanning direction and M detection points $(X_m, Y_m)$, m=1, 2, ..., M in an exposure field on a substrate to be photo-aligned, obtaining a polarization angle deviation $D(x(X_m, Y_m), y(X_m, Y_m, s \cdot y_k)$ and a corresponding illumination intensity level $I(x(X_m, Y_m), y(X_m, Y_m, s \cdot y_k)$ of polarized light for each of the detection points at each of the discrete sampling locations during photo-alignment, and a measuring yaw angle $yaw(s \cdot y_k)$ of a motion stage relative to a polarizing illumination device at each of the discrete sampling locations;

S200: calculating weighted dynamic polarization angle deviations $WD_{dyn}(X_m, Y_m)$ for the detection point $(X_m, Y_m)$ experiencing forward and reverse photo-alignment scans according to:

$$WD_{dyn}(X_m, Y_m) = \frac{\sum_{k=1}^{K}(I(x(X_m, Y_m), y(X_m, Y_m, s \cdot y_k)) \times (D(x(X_m, Y_m), y(X_m, Y_m, s \cdot y_k)) + Yaw(s \cdot y_k))) + \sum_{k=K}^{1}(I(x(X_m, Y_m), y(X_m, Y_m, s \cdot y_k)) \times (D(x(X_m, Y_m), y(X_m, Y_m, s \cdot y_k)) + Yaw(s \cdot y_k)))}{\sum_{k=1}^{K} I(x(X_m, Y_m), y(X_m, Y_m, s \cdot y_k)) + \sum_{k=K}^{1} I(x(X_m, Y_m), y(X_m, Y_m, s \cdot y_k))},$$

where, $(x(X_m, Y_m), y(X_m, Y_m, s \cdot y_k))$ represents coordinates of the detection points in a coordinate system of the motion stage, the detection point having coordinates $(X_m, Y_m)$ in a coordinate system of the substrate;

obtaining a weighted dynamic polarization angle deviation consistency $Mura_{dyn}$ for the substrate from:

$$Mura_{dyn} = \left| \frac{\max(WD_{dyn}(X_m, Y_m)) - \min(WD_{dyn}(X_m, Y_m))}{2} \right|;$$

and

S300: controlling a rotation of a rotary table for rotating the substrate, based on the yaw angle of the motion stage relative to the polarizing illumination device and on the weighted dynamic polarization angle deviation consistency of the substrate.

Specifically, in step S100, the polarization angle deviations $D(x(X_m, Y_m), y(X_m, Y_m, s \cdot y_k)$ obtained for each of the detection points during the photo-alignment process is a difference between actual polarization angle of the polarized light irradiated at the detection points during the photo-alignment process and a associated nominal polarization angle. The polarization angle deviations can be obtained by: detecting the actual polarization angle $P_A(x(X_m, Y_m), y(X_m, Y_m, s \cdot y_k)$ of the polarized light at the detection point during the photo-alignment process and calculating the polarization angle deviation according to $D(x(X_m, Y_m), y(X_m, Y_m, s \cdot y_k)=P_A(x(X_m, Y_m), y(X_m, Y_m, s \cdot y_k)-P_T(x(X_m, Y_m), y(X_m, Y_m, s \cdot y_k)$, where $P_T(x(X_m, Y_m), y(X_m, Y_m, s \cdot y_k)$ represents the nominal polarization angle.

In addition, in step S100, $(x(X_m, Y_m), y(X_m, Y_m, s \cdot y_k))$ represents a coordinate of the detection points in the coordinate system of the motion stage, which have coordinate $(X_m, Y_m)$ in the coordinate system of the substrate. Specifically, during the photo-alignment process, the substrate is carried on a support table and is rotated by an angle corresponding to the predetermined polarization angle. The substrate is then transported by the motion stage along the photo-alignment scanning direction to complete the photo-alignment process. Since the motion stage travels in a single direction, any deflection of the motion stage will exert an impact on the photo-alignment polarization angle. For this reason, it is necessary to confirm yaw angle $Yaw(s \cdot y_k)$ of the motion stage. However, during the photo-alignment process, as the substrate has been rotated by the rotary table based on the polarization angle, there is an offset between the coordinate system of the substrate and the coordinate system of the motion stage. In order to obtain accurate weighted dynamic polarization angle deviation for each of the detection points at each of the discrete sampling locations, conversion of their coordinates from the coordinate system of the substrate to the coordinate system of the motion stage is necessary. Specifically, this can be done according to:

$$\begin{pmatrix} x(X_m, Y_m) \\ y(X_m, Y_m, s \cdot y_k) \end{pmatrix} = \begin{pmatrix} \cos(Rt) & -\sin(Rt) \\ \sin(Rt) & \cos(Rt) \end{pmatrix}$$

$$\left( \begin{pmatrix} Mp & 0 \\ 0 & Mp \end{pmatrix} \begin{pmatrix} \cos(Rp) & -\sin(Rp) \\ \sin(Rp) & \cos(Rp) \end{pmatrix} \begin{pmatrix} X_m \\ Y_m \end{pmatrix} + \begin{pmatrix} Cpx \\ Cpy \end{pmatrix} \right) + \begin{pmatrix} 0 \\ s \cdot y_k \end{pmatrix},$$

where, Rt represents a rotation of the rotary table for rotating the substrate,

Mp represents an expansion ratio of the substrate to the motion stage under the rotary table, which reflects a positional variation of the substrate incurred by its own expansion, the motion stage having at least two degrees of freedom in the Y and Rz directions;

Rp represents a rotation of the substrate relative to the motion stage; and $\begin{pmatrix} Cpx \\ Cpy \end{pmatrix}$ represents a translation of the substrate relative to the motion stage.

Specifically, the rotation of the rotary table Rt, the expansion ratio of the substrate to the motion stage Mp, and the rotation of the substrate relative to the motion stage Rp may be obtained by a method including the steps of:

providing, on the substrate, I alignment marks whose nominal positions in the coordinate system of the substrate are denoted as $(X_i, Y_i)$, i=1, 2, . . . , I;

aligning the I alignment marks using an alignment system and obtaining test positions $(Cax_i, Cay_i)$, i=1, 2, . . . , I of the alignment marks in the coordinate system of the motion stage; and based on the nominal positions $(X_i, Y_i)$, i=1, 2, . . . , I and test positions $(Cax_i, Cay_i)$, i=1, 2, . . . , I of the alignment marks, as well as corresponding positions $(s \cdot y_i)$, i=1, 2, . . . , I of the motion stages during the alignments, obtaining Rt, Mp and Rp according to:

$$\begin{pmatrix} Cax_i \\ Cay_i \end{pmatrix} = \begin{pmatrix} \cos(Rt) & -\sin(Rt) \\ \sin(Rt) & \cos(Rt) \end{pmatrix}$$

$$\left( \begin{pmatrix} Mp & 0 \\ 0 & Mp \end{pmatrix} \begin{pmatrix} \cos(Rp) & -\sin(Rp) \\ \sin(Rp) & \cos(Rp) \end{pmatrix} \begin{pmatrix} X_i \\ Y_i \end{pmatrix} + \begin{pmatrix} Cpx \\ Cpy \end{pmatrix} \right) + \begin{pmatrix} 0 \\ s \cdot y_i \end{pmatrix}.$$

Further, according to this embodiment, in step S100, a yaw angle $Yaw(s \cdot y_k)$ of the motion stage relative to the polarizing illumination device at the each discrete sampling locations can be measured by a method including: measuring yaw angles $Yaw_1(s \cdot y_k)$ of the motion stage at each discrete sampling locations and yaw angles $Yaw_2(s \cdot y_k)$ of the polarizing illumination device at each discrete sampling locations respectively, if $Yaw_2(s \cdot y_k) < Yaw_1(s \cdot y_k)/10$, then $Yaw(s \cdot y_k) = Yaw_1(s \cdot y_k)$.

Figure 2A:
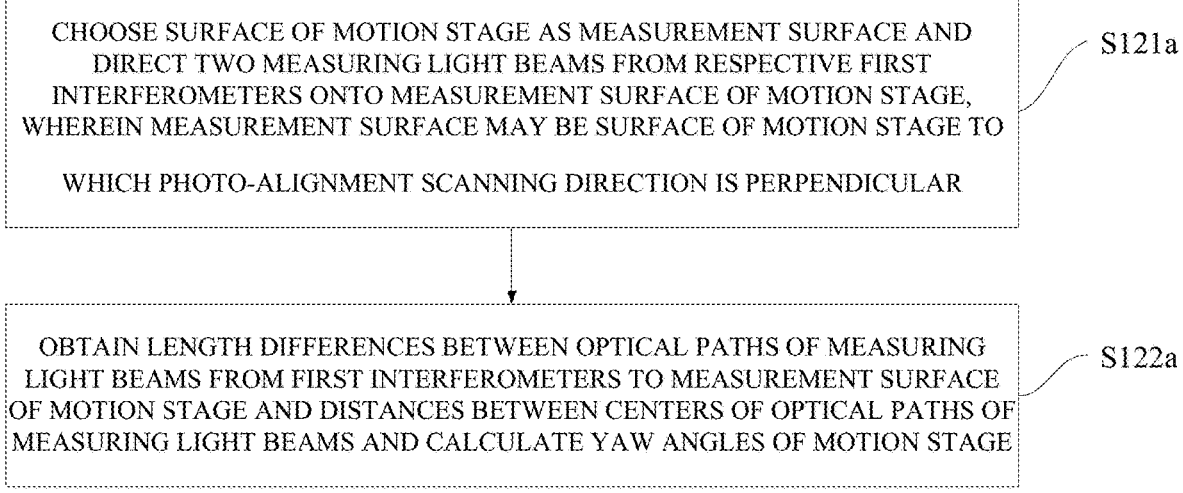
FIG. 2a is a flowchart schematically showing a process for measuring yaw angles of a motion stage in the photo-alignment control method according to Example 1 of the present invention.

Furthermore, the yaw angles of the motion stage at the discrete sampling locations may be measured following the schematic flowchart of FIG. 2a based on the principles as shown in FIG. 3.

In step S121a, a surface of the motion stage 10 is chosen as a measurement surface 11, and two measuring light beams 20 from respective first interferometers are directed onto the measurement surface 11 of the motion stage. The measurement surface 11 may be a surface of the motion stage 10 to which the photo-alignment scanning direction is perpendicular.

In step S122a, length differences $\Delta y_1$ between optical paths of the two measuring light beams from the first interferometers to the measurement surface of the motion stage (i.e., the absolute difference between y1 and y1' in FIG. 3) and distances $s_1$ between centers of the optical paths of the measuring light beams are obtained, based on which, the yaw angles $Yaw_1(s \cdot y_k)$ of the motion stage are calculated according to $Yaw_1(s \cdot y_k) = \Delta y_1/s_1$.

The first interferometers may each include a transmitter, a receiver and a corner reflector attached to the measurement surface (none of them are shown). During the measurement, the light beam emanated from the transmitter is incident on the corner reflector attached to the measurement surface and is reflected back by the corner reflector, and the receiver receives the reflected light and processes data. In this way, using the two first interferometers enables obtainment of length differences between the corresponding two optical paths of the two first interferometers. Since the interferometers are capable of emitting and receiving light in real time, real-time yaw angle measurements of the motion stage are possible, which facilitates the online monitoring for the deflection of the motion stage and further to achieve compensation and adjustment for the deflection of the motion stage in real time and thus ensuring positioning accuracy of the motion stage.

Of course, instead of the first interferometers, the yaw angles of the motion stage may be alternatively measured using grating scales. Specifically, with reference to FIG. 2b, the yaw angles of the motion stage at each of the discrete sampling locations may be measured by a method including the steps of:

S121b: providing two grating scales extending parallel to each other along the photo-alignment scanning direction and mounting reading heads corresponding to the respective grating scales on a side surface of the motion stage to which the photo-alignment scanning direction is perpendicular; and S122b: obtaining readings of the grating scales by the respective reading heads and calculating, based on differences between the readings $\Delta y_1$ and on distances $s_1$ between centers of the two grating scales, the yaw angles $Yaw_1(s \cdot y_k)$ of the motion stage, according to $Yaw_1(s \cdot y_k) = \Delta y_1/s_1$.

With similarity to the measurement of the yaw angles $Yaw_1(s \cdot y_k)$ of the motion stage, the yaw angles $Yaw_2(s \cdot y_k)$ of the polarizing illumination device at each of the discrete sampling locations may be measured by a method including the steps of:

choosing a side surface of a linear grating frame in the polarizing illumination device as a measurement surface and directing two measuring light beams from respective second interferometers onto the measurement surface of the polarizing illumination device, wherein the measurement surface of the polarizing illumination device may be a side surface of the linear grating frame to which the photo-alignment scanning direction is perpendicular, and the second interferometers may be similar to the first interferometers and therefore will not be further detailed here for the sake of simplicity; and obtaining length differences $\Delta y_2$ between optical paths of the two measuring light beams from the second interferometers to the measurement surface of the polarizing illumination device and distances $s_2$ between centers of the optical paths of the two measuring light beams, and calculating the yaw angles $Yaw_2(s \cdot y_k)$ of the polarizing illumination device according to $Yaw_2(s \cdot y_k) = \Delta y_2/s_2$.

In summary, with the photo-alignment control method according to this Example, it is not only possible to assess and monitor yaw angles of the motion stage relative to the polarizing illumination device but also to confirm, based on the assessment, the weighted dynamic polarization angle deviation consistency of the substrate, which is a direct reflection of the alignment angle consistency throughout the entire substrate surface during the photo-alignment process. Moreover, in the photo-alignment control method according to this Example, it is allowed to adjust the rotation of the rotary table and hence of the substrate based on the weighted dynamic polarization angle deviations such as to ensure the polarization angle acting on the substrate surface remains within a desired range.

Embodiment 2

Figure 4:
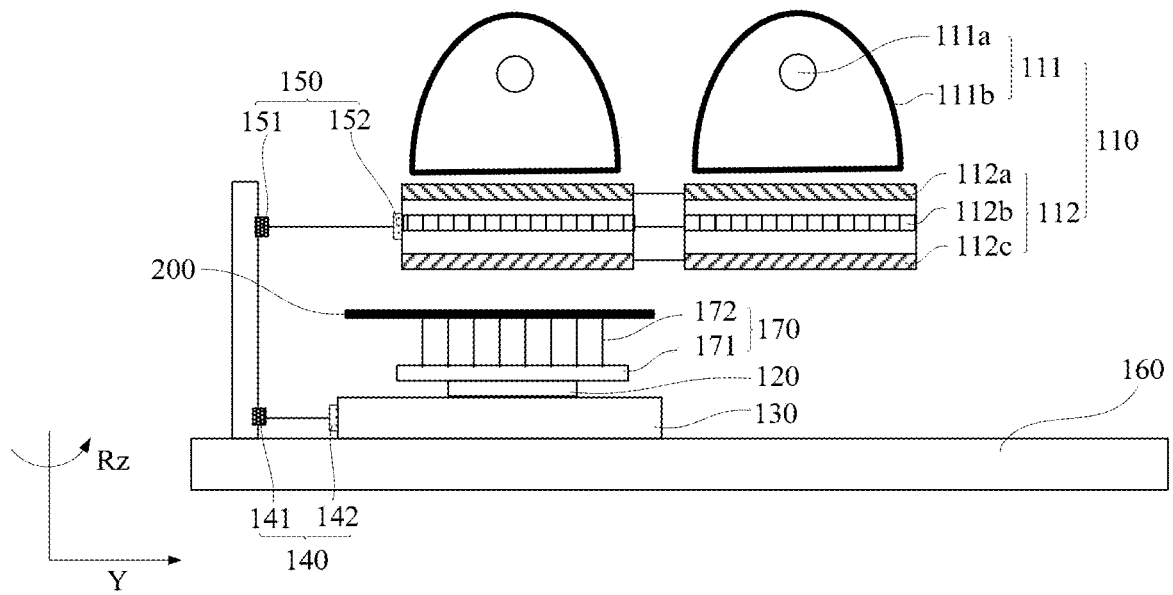
FIG. 4 is a side view of a photo-alignment apparatus according to Example 2 of the present invention.
Figure 5:
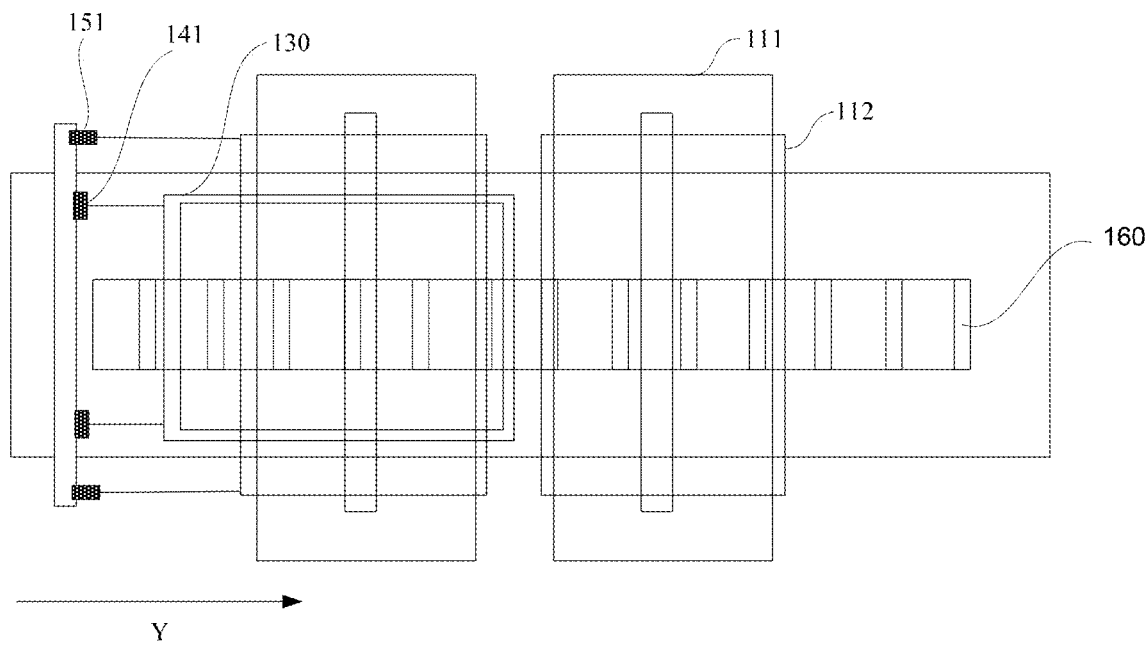
FIG. 5 is a top view of the photo-alignment apparatus according to Example 2 of the present invention.

Based on the photo-alignment control method discussed above, the present invention also provides a photo-alignment apparatus. FIG. 4 shows a side view of the photo-alignment apparatus according to Embodiment 2, while FIG. 5 is a top view of the photo-alignment apparatus. With combined reference to FIGS. 4 and 5, the photo-alignment apparatus includes a polarizing illumination device 110, a rotary table 120 for rotating a substrate carried thereon, and a motion stage 130 disposed under the rotary table 120 and configured to perform a photo-alignment scanning process. The photo-alignment apparatus further includes:

a motion stage yaw measurement device 140 for measuring yaw angles of the motion stage 130 during the photo-alignment process;

a polarizing illumination device yaw measurement device 150 for measuring yaw angles of the polarizing illumination device 110 during the photo-alignment process; and a polarization angle deviation control unit capable of calculating weighted dynamic polarization angle deviations of the substrate 200 based on the yaw angles of the motion stage 130 and the yaw angles of the polarizing illumination device 110 and controlling rotation of the rotary table 120 based on yaw angles of the motion stage relative to the polarizing illumination device and on the weighted dynamic polarization angle deviations of the substrate.

With the photo-alignment apparatus according to this embodiment, after acquiring the yaw angles of the motion stage 130 and the yaw angles of the polarizing illumination device 110, the polarization angle deviation control unit can adjust the angle by which the rotary table 120 is rotated, thus avoiding the substrate 200 from shifting from the original angular position and hence improving polarization axis accuracy of photo-alignment apparatus. In other words, the photo-alignment apparatus according to this embodiment operates as a closed-loop feedback system which is not only capable of detecting and monitoring the overall performance of the photo-alignment apparatus but also allows automatic adjustments based on the detected result so as to increase photo-alignment control accuracy.

Specifically, the motion stage yaw measurement device 140 includes a first interferometric measuring device 141 and a first reflector 142. The first reflector 142 is mounted on a side surface of the motion stage 130. For example, the first reflector 142 may be mounted on a side surface of the motion stage 130 to which the photo-alignment scanning direction is perpendicular. The first interferometric measuring device 141 emits two first measuring light beams onto the first reflector 142 and collects the reflected light beams from the first reflector 142 to obtain length differences $\Delta y_1$ between two optical paths of the first measuring light beams from the first interferometric measuring device to the side surface of the motion stage. Based on the length differences $\Delta y_1$ and distances $s_1$ between centers of the two first measuring light beams, the yaw angles $Yaw_1(s \cdot y_k)$ of the motion stage are calculated according to $Yaw_1(s \cdot y_k) = \Delta y_1/s_1$. The first interferometric measuring device may be implemented either as two single-axis interferometers or one two-axis interferometer.

With continued reference to FIGS. 4 and 5, the polarizing illumination device yaw measurement device 150 includes a second interferometric measuring device 151 and a second reflector 152 (e.g., a corner reflector). The second reflector 152 is mounted on a side surface of a linear grating frame 112 in the polarizing illumination device 150. Specifically, the side surface of the linear grating frame 112 on which the second reflector 152 is mounted may be a side surface of the linear grating frame to which the photo-alignment scanning direction is perpendicular. The second interferometric measuring device 151 emits two second measuring light beams onto the second reflector 152 and collects the reflected light beams from the second reflector to obtain length differences $\Delta y_2$ between optical paths of the two second measuring light beams from the second interferometric measuring device to the side surface of the linear grating frame 112. Based on the length differences $\Delta y_2$ and distances $s_2$ between centers of the two second measuring light beams, the yaw angles $Yaw_2(s \cdot y_k)$ of the polarizing illumination device are calculated according to $Yaw_2(s \cdot y_k) = \Delta y_2/s_2$. Similar to the first interferometric measuring device 140, the second interferometric measuring device 150 may also be implemented either as two single-axis interferometers or one two-axes interferometer.

As noted above, since the polarizing illumination device 110 is crucial in the formation of the polarized light, any shift in the angular position of the polarizing illumination device 110 will lead to an adverse impact on polarization axis direction of the polarized light and hence on the photo-alignment of the alignment film Therefore, it is also important to measure yaw angles of the polarizing illumination device 110. The polarizing illumination device yaw measurement device 150 is capable of monitoring the polarizing illumination device 110 in real time.

With continued reference to FIGS. 4 and 5, the polarizing illumination device 110 includes a lighting frame 111 having a trough-shaped reflector 111a and a lamp 111b. Light from the lamp 111b can be reflected by the trough-shaped reflector 111a to form a light beam propagating at a certain angle. The trough-shaped reflector 111a is preferably a parabolic reflector. Additionally, the lamp 111b may be an elongated UV lamp for emitting UV light onto the substrate and thereby triggering photoreaction in the alignment film attached to the substrate. Preferably, the lamp 111b has a length greater than a length of the substrate 200 in the direction perpendicular to the photo-alignment scanning direction (i.e., the Y direction in FIG. 4). This ensures an exposure field of the lamp 111b to encompass a part of the substrate 200 in the direction perpendicular to the scanning direction so that the photo-alignment of the entire substrate can be completed by transporting the substrate 200 by the motion stage 130 in the scanning direction. In practice, the size of the lamp may be selected based on the substrate to be photo-aligned. For example, for the fabrication of a Gen 4.5 LCD panel with a 730 mm×920 mm substrate, the length of the lamp 111b may be selected to be greater than 730 mm During the photo-alignment process, it is not necessary for the lamp 111b to be absolutely parallel to the substrate 200. That is, the substrate may be rotated by an angle relative to the lamp. Continuing the example of the 4.5 LCD panel, in order to ensure the photo-alignment of the entire alignment film on the substrate with the substrate 200 rotated relative to the lamp 111b by an angle in the range of 0°±15°, 90°±15° or 180°±15°, the exposure field of the lamp 111b needs to be sized greater than or equal to 1109 mm.

With continued reference to FIGS. 4 and 5, the polarizing illumination device 110 includes a linear grating frame 112 for shaping the light from the lighting frame 111 into the polarized light for exposing and photo-aligning the surface of the substrate 200. Specifically, the linear grating frame 112 may include a stack of a filter 112a, a polarizing linear grating 112b and linear grating protection glass 112c. Compressed air is introduced between the filter 112a and the polarizing linear grating 112b, while an inert gas, preferably, nitrogen, is introduced between the polarizing linear grating 112b and the linear grating protection layer 112c.

The filter 112a faces the lighting frame 111 and is configured to filter the light emitted from the light source 111b to obtain light of a particular wavelength band. Since different alignment films require photo-aligning light of different wavelength bands, the filter 112a may be selected to obtain light of a desired wavelength band. For example, a 254-nm alignment film requires photo-aligning light of a wavelength ranging from 240 nm to 300 nm, so the filter 112a can be selected to obtain light of this wavelength band.

Further, light of the particular wavelength band passing through the filter 112a is incident on the polarizing linear grating 112b located farther from the lighting frame 111 than the filter 112a and converted by the polarizing linear grating into the polarized light. Specifically, the polarizing linear grating 112b may include a transparent substrate and a grating formed on the substrate. The grating consists of a number of strips and is disposed on the surface of the polarizing linear grating 112b facing toward the linear grating protection glass 112c. The grating may be formed of a metal or a metal compound, such as aluminum (Al) or titanium oxide ($TiO_2$). Preferably, in order for the polarized light to have a high extinction ratio (>50:1), according to the current common practice, titanium oxide may be used to fabricate the grating, because in addition to a good extinction of the polarized light, this material immunizes the light incident on the polarizing linear grating 112b even at a certain angle from any degradation in its transmittance and immunizes the resulting polarized light of the polarizing linear grating 112b from any change in its polarization axis direction. The grating fabricated from titanium oxide according to the current common practice can achieve an extinction ratio greater than 50:1 and a rotation of the polarization axis less than 0.1° at an angle of incidence of up to about 45°.

According to this embodiment, the compressed air is introduced between the filter 112a and the polarizing linear grating 112b to cool the linear grating frame 112. During the photo-alignment process, the light emitted from the lighting frame 111 is always irradiated on the linear grating frame 112, generating a great large amount of heat and tending to raise the temperature of the linear grating frame 112. An excessively high temperature of the linear grating frame 112 will be detrimental to the polarization of the light. For example, at a temperature higher than 180□, the grating tends to experience an expansion, which will alter the grating pitch and ultimately degrade the polarization of the light. For this reason, according to this embodiment, the compressed air for cooling is introduced between the filter 112a and the polarizing linear grating 112b to prevent the temperature of the polarizing illumination device 110 from going extremely high. In addition, nitrogen is introduced between the polarizing linear grating 112b and the linear grating protection glass 152c so as to prevent the grating located on the surface of the polarizing linear grating 112b facing the linear grating protection glass 112c from being oxidized and degrading the polarizing ability of the grating. Introducing nitrogen between the polarizing linear grating 112b and the linear grating protection glass 112c can avoid the grating, in particular when it is made of a metal, from experiencing problematic oxidation.

With continued reference to FIG. 5, according to this embodiment, the photo-alignment apparatus further includes a guide track 160 extending along the photo-alignment scanning direction. The motion stage 130 is mounted on the guide track 160 and can slide thereon to transport the substrate to fulfill the photo-alignment. Additionally, the photo-alignment apparatus also includes a support table 170 on which the substrate 200 is carried. The support table 170 is disposed above the motion stage 130 and the rotary table 120. The rotary table 120 is attached to the support table 170 and can rotate the support table by a desired angle. Preferably, the support table 170 includes a base 171 and a plurality of pins 172 provided on the base 171. The pins 172 are in contact with and hence support the substrate. The photo-alignment process begins with placement of the substrate 200 onto the pins 172. The motion stage 130 then transports the substrate 200 to a position for alignment. After the alignment of the substrate 200 is completed, the rotary table 120 adjusts the rotational angle of the substrate 200 so that a correspondingly predetermined polarization angle of the polarization axis will be achieved. At last, the motion stage 130 transports the substrate 200 forth and back along the scanning direction to complete the photo-alignment process.

Embodiment 3

Figure 6:
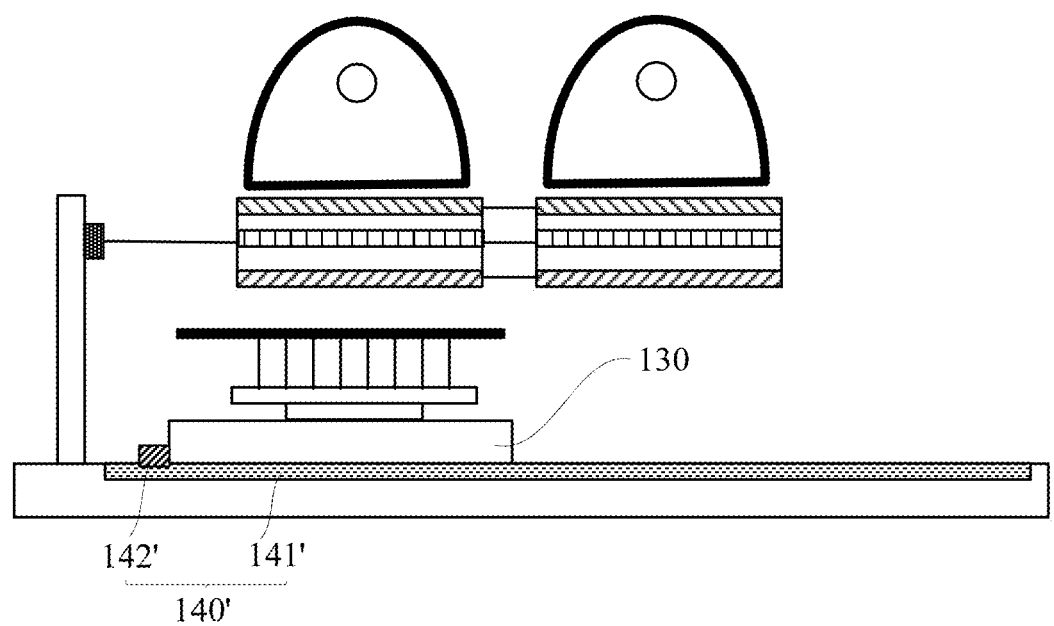
FIG. 6 is a side view of a photo-alignment apparatus according to Example 3 of the present invention.
Figure 7:
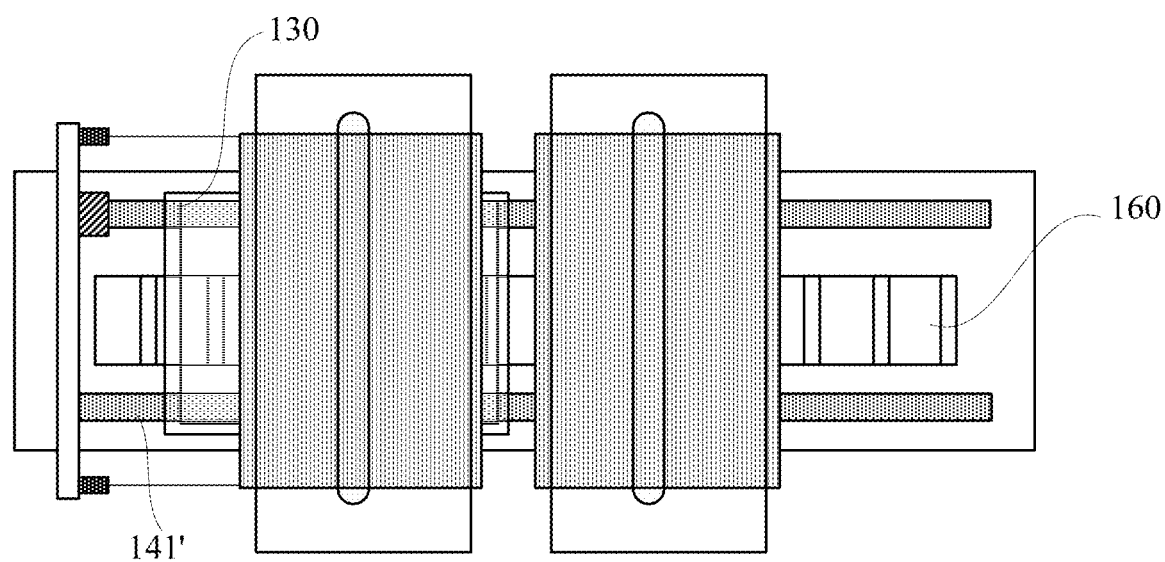
FIG. 7 is a top view of the photo-alignment apparatus according to Example 3 of the present invention.

FIG. 6 shows a side view of a photo-alignment apparatus according to Embodiment 3 of the present invention, and FIG. 7 is a top view thereof. With combined reference to FIGS. 6 and 7, this embodiment differs from Embodiment 2 in that: the motion stage yaw measurement device 140' includes two grating scales' extending parallel to each other along the photo-alignment scanning direction; and reading heads 142' corresponding to the respective grating scales'. The reading heads 142' are mounted on a side surface of the motion stage 130 to which the photo-alignment scanning direction is perpendicular and are configured to obtain readings of the respective grating scales and calculate yaw angles $Yaw_1(s \cdot y_k)$ of the motion stage based on differences $\Delta y_1$ between the readings of the two grating scales and on distances $s_1$ between centers of the two grating scales, according to $Yaw_1(s \cdot y_k) = \Delta y_1/s_1$.

Specifically, the grating scales 141' extend parallel to the guide track 160. Moreover, the grating scales 141' are each provided with a scale for indicating the distance. The reading heads 142' are disposed opposite to the grating scales 141' to acquire the readings of the grating scales 141'. During the photo-alignment process, the reading heads 142' travels in synchronization with the motion stage 130 and sense the readings of the grating scales 141'. At the same time, the data are feed back in real time. In this way, differences $\Delta y_1$ between the measurements of the two grating scales and distances $s_1$ between centers of the two grating scales can be obtained.

In summary, in the photo-alignment apparatus according to this embodiment, the polarization angle deviation control unit monitors and adjusts yaw angles of the motion stage and the polarizing illumination device in real time. This, on the one hand, increases a positioning accuracy of the motion stage and, on the other hand, enhances a photo-alignment control accuracy of the photo-alignment apparatus, thus ensuring the polarization angle acting on the substrate to remain within the predetermined range. Further, the detection results of the polarization angle deviation control unit directly characterize polarization angle consistency throughout the entire substrate during the photo-alignment process and can thus better reflect real alignment angle errors in the alignment film.

The embodiments disclosed herein are described in a progressive manner, with the description of each embodiment focusing on its differences from the other embodiments. Reference can be made between the embodiments for a detail description of any feature common or essentially common to them.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A photo-alignment control method for controlling a polarization angle deviation consistency of a polarized light during photo-alignment of a substrate by using the polarized light emanated from a polarizing illumination device, the photo-alignment control method comprising:
    selecting a plurality of discrete sampling locations along a photo-alignment scanning direction and selecting a plurality of detection points within an exposure field on the substrate, obtaining a polarization angle deviation and a corresponding illumination intensity level for each of the detection points at each of the discrete sampling locations during photo-alignment, and measuring a yaw angle of the motion stage, on which the substrate is carried, relative to the polarizing illumination device at each of the discrete sampling locations;
    calculating a weighted dynamic polarization angle deviation for each detection point after forward and reverse photo-alignment scans have been carried out $WD_{dyn}(X_m, Y_m)$,
    obtaining a weighted dynamic polarization angle deviation consistency; and
    controlling a rotation angle of a rotary table disposed between the substrate and the motion stage and configured to rotate the substrate, based on the yaw angle of the motion stage relative to the polarizing illumination device and on the weighted dynamic polarization angle deviation consistency of the substrate;
    wherein the polarization angle deviation is a difference between an actual polarization angle of the polarized light received at the detection point during the photo-alignment process and a nominal polarization angle of the polarized light.

2. The photo-alignment control method of claim 1, wherein K discrete sampling locations $s \cdot y_k$, k=1, 2, . . . , K and M detection points $(X_m, Y_m)$, m=1, 2, . . . , M are selected;
    wherein the weighted dynamic polarization angle deviation for each detection point after forward and reverse photo-alignment scans have been carried out is calculated-according to:

$$WD_{dyn}(X_m, Y_m) = \frac{\sum_{k=1}^{K}(I(x(X_m, Y_m), y(X_m, Y_m, s \cdot y_k)) \times (D(x(X_m, Y_m), y(X_m, Y_m, s \cdot y_k)) + Yaw(s \cdot y_k))) + \sum_{k=K}^{1}(I(x(X_m, Y_m), y(X_m, Y_m, s \cdot y_k)) \times (D(x(X_m, Y_m), y(X_m, Y_m, s \cdot y_k)) + Yaw(s \cdot y_k)))}{\sum_{k=1}^{K} I(x(X_m, Y_m), y(X_m, Y_m, s \cdot y_k)) + \sum_{k=K}^{1} I(x(X_m, Y_m), y(X_m, Y_m, s \cdot y_k))},$$

where $D(x(X_m, Y_m), y(X_m, Y_m, s \cdot y_k)$ represents the polarization angle deviation, $I(x(X_m, Y_m), y(X_m, Y_m, s \cdot y_k)$ represents the corresponding illumination intensity level, Yaw(s·y$_k$) represents the measured yaw angle of the motion stage, WD$_{dyn}$(X$_m$, Y$_m$) represents the weighted dynamic polarization angle deviation, (X$_m$, Y$_m$) represents the each detection point, (x(X$_m$, Y$_m$), y(X$_m$, Y$_m$, s·y$_k$)) represents a coordinate of the detection point in a coordinate system of the motion stage, the detection point having a coordinate of (X$_m$, Y$_m$) in a coordinate system of the substrate;

wherein the a weighted dynamic polarization angle deviation consistency for the substrate is obtained according to:

$$Mura_{dyn} = \left| \frac{\max(WD_{dyn}(X_m, Y_m)) - \min(WD_{dyn}(X_m, Y_m))}{2} \right|,$$

where Mura$_{dyn}$ represents the weighted dynamic polarization angle deviation consistency.

3. The photo-alignment control method of claim 2, wherein (x(X$_m$, Y$_m$), y(X$_m$, Y$_m$, s·y$_k$)) is given by:

$$\begin{pmatrix} x(X_m, Y_m) \\ y(X_m, Y_m, s \cdot y_k) \end{pmatrix} = \begin{pmatrix} \cos(Rt) & -\sin(Rt) \\ \sin(Rt) & \cos(Rt) \end{pmatrix}$$
$$\left( \begin{pmatrix} Mp & 0 \\ 0 & Mp \end{pmatrix} \begin{pmatrix} \cos(Rp) & -\sin(Rp) \\ \sin(Rp) & \cos(Rp) \end{pmatrix} \begin{pmatrix} X_m \\ Y_m \end{pmatrix} + \begin{pmatrix} Cpx \\ Cpy \end{pmatrix} \right) + \begin{pmatrix} 0 \\ s \cdot y_k \end{pmatrix};$$

where Rt represents a rotation of the rotary table for rotating the substrate,

Mp represents an expansion ratio of the substrate to the motion stage located under the rotary table, Rp represents a rotation of the substrate relative to the motion stage, and $$\begin{pmatrix} Cpx \\ Cpy \end{pmatrix}$$

represents a translation of the substrate relative to the motion stage.

4. The photo-alignment control method of claim 3, wherein the rotation Rt of the rotary table, the expansion ratio Mp of the substrate to the motion stage located under the rotary table, and the rotation Rp of the substrate relative to the motion stage are obtained by:

providing, on the substrate, I alignment marks with nominal positions of the I alignment marks in the coordinate system of the substrate being denoted as (X$_i$, Y$_i$), i=1, 2, . . . , I;

individually aligning the I alignment marks using an alignment system to obtain test positions (Cax$_i$, Cay$_i$), i=1, 2, . . . , I of the I alignment marks; and based on the nominal positions (X$_i$, Y$_i$), i=1, 2, . . . , I and the test positions (Cax$_i$, Cay$_i$), i=1, 2, . . . , I of the alignment marks, as well as a corresponding position (s·y$_i$), i=1, 2, . . . , I of the motion stage during the alignment, obtaining Rt, Mp and Rp according to a substrate alignment model defined by:

$$\begin{pmatrix} Cax_i \\ Cay_i \end{pmatrix} = \begin{pmatrix} \cos(Rt) & -\sin(Rt) \\ \sin(Rt) & \cos(Rt) \end{pmatrix}$$
$$\left( \begin{pmatrix} Mp & 0 \\ 0 & Mp \end{pmatrix} \begin{pmatrix} \cos(Rp) & -\sin(Rp) \\ \sin(Rp) & \cos(Rp) \end{pmatrix} \begin{pmatrix} X_i \\ Y_i \end{pmatrix} + \begin{pmatrix} Cpx \\ Cpy \end{pmatrix} \right) + \begin{pmatrix} 0 \\ s \cdot y_i \end{pmatrix}.$$

5. The photo-alignment control method of claim 2, wherein measuring a yaw angle Yaw(s·y$_k$) of the motion stage relative to the polarizing illumination device at each of the discrete sampling locations comprises:

measuring a yaw angle Yaw$_1$(s·y$_k$) of the motion stage at each of the discrete sampling locations and a yaw angle Yaw$_2$(s·y$_k$) of the polarizing illumination device at each of the discrete sampling locations, and obtaining Yaw (s·y$_k$) as Yaw(s·y$_k$)=Yaw$_1$(s·y$_k$)/Yaw$_2$(s·y$_k$).

6. The photo-alignment control method of claim 5, wherein measuring the yaw angle Yaw$_1$(s·y$_k$) of the motion stage at each of the discrete sampling locations comprises:

selecting a side face of the motion stage as a measurement surface and directing two measuring light beams of a first interferometer onto the measurement surface; and obtaining a length difference Δy$_1$ between optical paths of the two measuring light beams of the first interferometer to the measurement surface of the motion stage and a distance s$_1$ between centers of the optical paths of the two measuring light beams and calculating the yaw angle Yaw$_1$(s·y$_k$) of the motion stage according to Yaw$_1$(s·y$_k$)=Δy$_1$/s$_1$.

7. The photo-alignment control method of claim 6, wherein the measurement surface is a side face of the motion stage to which the photo-alignment scanning direction is perpendicular.

8. The photo-alignment control method of claim 6, wherein measuring the yaw angle Yaw$_2$(s·y$_k$) of the polarizing illumination device at each of the discrete sampling locations comprises:

selecting a side face of a linear grating frame in the polarizing illumination device as a measurement surface and directing two measuring light beams of a second interferometer onto the measurement surface; and obtaining a length difference Δy$_2$ between optical paths of the two measuring light beams of the second interferometer to the measurement surface of the polarizing illumination device and a distance s$_2$ between centers of the optical paths of the two measuring light beams, and calculating the yaw angle Yaw$_2$(s·y$_k$) of the polarizing illumination device according to Yaw$_2$(s·y$_k$)=Δy$_2$/s$_2$.

9. The photo-alignment control method of claim 8, wherein the measurement surface of the polarizing illumination device is a side face of the linear grating frame to which the photo-alignment scanning direction is perpendicular.

10. The photo-alignment control method of claim 5, wherein measuring the yaw angle Yaw$_1$(s·y$_k$) of the motion stage at each of the discrete sampling locations comprises:

providing two grating scales arranged parallel to each other along the photo-alignment scanning direction and mounting reading heads corresponding to the respective grating scales on a side face of the motion stage to which the photo-alignment scanning direction is perpendicular; and obtaining readings of the grating scales by the respective reading heads and based on a difference Δy$_1$ between the readings of the two grating scales and on a distance s$_1$ between centers of the two grating scales, calculating the yaw angle Yaw$_1$(s·y$_k$) of the motion stage according to Yaw$_1$(s·y$_k$)=Δy$_1$/s$_1$.

11. The photo-alignment control method of claim 5, wherein $Yaw(s \cdot y_k)$ is calculated according to:

$$\begin{cases} Yaw_2(s \cdot y_k) \geq Yaw_1(s \cdot y_k)/10, & Yaw(s \cdot y_k) = Yaw_1(s \cdot y_k)/Yaw_2(s \cdot y_k) \\ Yaw_2(s \cdot y_k) < Yaw_1(s \cdot y_k)/10, & Yaw(s \cdot y_k) = Yaw_1(s \cdot y_k) \end{cases}$$

12. A photo-alignment apparatus, comprising a polarizing illumination device, a rotary table configured to carry and rotate a substrate, and a motion stage located under the rotary table and configured to move the substrate so that the substrate experiences a photo-alignment scan, wherein the photo-alignment apparatus further comprises:
 a motion stage yaw measurement device for measuring a yaw angle of the motion stage during the photo-alignment process;
 a polarizing illumination device yaw measurement device for measuring a yaw angle of the polarizing illumination device during the photo-alignment process; and
 a polarization angle deviation control unit configured to calculate a weighted dynamic polarization angle deviation of the substrate based on the yaw angle of the motion stage and the yaw angle of the polarizing illumination device and to control a rotation of the rotary table based on a yaw angle of the motion stage relative to the polarizing illumination device and the weighted dynamic polarization angle deviation of the substrate.

13. The photo-alignment apparatus of claim 12, wherein the motion stage yaw measurement device comprises a first interferometric measuring device and a first reflector, the first reflector mounted on a side face of the motion stage, the first interferometric measuring device configured to direct two first measuring light beams onto the first reflector and to collect light beams reflected from the first reflector so as to obtain a length difference $\Delta y_1$ between optical paths of the two first measuring light beams from the first interferometric measuring device to the side face of the motion stage, and to calculate, based on the length difference $\Delta y_1$ and a distance $s_1$ between centers of the two first measuring light beams of the first interferometric measuring device, the yaw angle $Yaw_1(s \cdot y_k)$ of the motion stage according to $Yaw_1(s \cdot y_k) = \Delta y_1/s_1$.

14. The photo-alignment apparatus of claim 13, wherein the first reflector is mounted on a side face of the motion stage to which the photo-alignment scanning direction is perpendicular.

15. The photo-alignment apparatus of claim 13, wherein the polarizing illumination device measurement device comprises a second interferometric measuring device and a second reflector, the second reflector mounted on a surface of a linear grating frame in the polarizing illumination device, the second interferometric measuring device configured to emit two second measuring light beams onto the second reflector and to collect light beams reflected from the second reflector so as to obtain a length difference $\Delta y_2$ between optical paths of the two second measuring light beams from the second interferometric measuring device to the side face of the linear grating frame, and to calculate, based on the length difference $\Delta y_2$ and a distance $s_2$ between centers of the two second measuring light beams, the yaw angle $Yaw_2(s \cdot y_k)$ of the motion stage according to $Yaw_2(s \cdot y_k) = \Delta y_2/s_2$.

16. The photo-alignment apparatus of claim 15, wherein the second reflector is mounted on the side face of the linear grating frame to which the photo-alignment scanning direction is perpendicular.

17. The photo-alignment apparatus of claim 12, wherein the motion stage yaw measurement device comprises two grating scales arranged parallel to each other along the photo-alignment scanning direction and reading heads corresponding to the respective grating scales, the reading heads mounted on a side face of the motion stage to which the photo-alignment scanning direction is perpendicular, the reading heads configured to acquire readings of the respective grating scales and to calculate, based on a difference $\Delta y_1$ between the readings of the two grating scales and on a distance $s_1$ between centers of the two grating scales, the yaw angle $Yaw_1(s \cdot y_k)$ of the motion stage according to $Yaw_1(s \cdot y_k) = \Delta y_1/s_1$.

18. The photo-alignment apparatus of claim 12, wherein the polarizing illumination device comprises a lighting frame, the lighting frame comprising a trough-shaped reflector and a lamp, the lamp configured to emit light which is reflected by the trough-shaped reflector to form a light beam propagating at a predetermined angle.

19. The photo-alignment apparatus of claim 18, wherein the trough-shaped reflector is a parabolic reflector.

20. The photo-alignment apparatus of claim 18, wherein the lamp has a length greater than a length of the substrate in a direction perpendicular to the photo-alignment scanning direction.

21. The photo-alignment apparatus of claim 12, wherein the polarizing illumination device comprises a linear grating frame, the linear grating frame comprising a stack of a filter, a polarizing linear grating and a linear grating protection glass, compressed air introduced between the filter and the polarizing linear grating, an inert gas introduced between the polarizing linear grating and the linear grating protection glass.

* * * * *